US012092396B2

(12) United States Patent
Allen

(10) Patent No.: US 12,092,396 B2
(45) **Date of Patent: *Sep. 17, 2024**

(54) LOCKER WITH EQUIPMENT RACK

(71) Applicant: AIM Design, LLC, Desoto, TX (US)

(72) Inventor: Sam Allen, Maypearl, TX (US)

(73) Assignee: AIM Design, LLC, Desoto, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,099

(22) Filed: Mar. 21, 2023

(65) Prior Publication Data

US 2023/0221075 A1 Jul. 13, 2023

Related U.S. Application Data

(63) Continuation of application No. 17/189,647, filed on Mar. 2, 2021, now Pat. No. 11,609,045, which is a (Continued)

(51) Int. Cl.

| | |
|---|---|
| ***F26B 21/00*** | (2006.01) |
| ***A47B 61/00*** | (2006.01) |
| ***A47B 61/02*** | (2006.01) |
| ***A47B 61/04*** | (2006.01) |
| ***A47B 83/00*** | (2006.01) |

(Continued)

(52) U.S. Cl.

CPC .......... *F26B 21/006* (2013.01); *A47B 61/003* (2013.01); *A47B 61/02* (2013.01); *A47B 61/04* (2013.01); *A47B 83/00* (2013.01); *A63B 71/0036* (2013.01); *F26B 9/003* (2013.01); *F26B 9/06* (2013.01); *A47B 88/40* (2017.01); (Continued)

(58) Field of Classification Search

CPC .......... F26B 21/006; F26B 9/003; F26B 9/06; A47B 61/003; A47B 61/02; A47B 61/04; A47B 83/00; A47B 88/40; A47B 2220/0077; A47B 2220/0091; A63B 71/0036

See application file for complete search history.

(56) References Cited

U.S. PATENT DOCUMENTS 5,377,849 A * 1/1995 Martin ............... A63B 71/0036 D6/552
6,880,711 B2 * 4/2005 Collier .................. A47G 25/16 211/85.3

(Continued)

FOREIGN PATENT DOCUMENTS

| | | | |
|---|---|---|---|
| CH | 712116 A2 * | 8/2017 | |
| FR | 3002313 A1 * | 8/2014 | ............. F26B 9/003 |
| JP | 2010194275 A | 9/2010 | |

OTHER PUBLICATIONS

Translation, CH-712116-A2, Aug. 2017 (Year: 2017).*
Translation, FR-3002313-A1,Aug. 2014 (Year: 2014).*
Clemson Football Operations Facility Construction Documents, dated Mar. 15, 2016, p. 290.

(Continued)

*Primary Examiner* — Jessica Yuen
(74) *Attorney, Agent, or Firm* — James E. Walton

(57) ABSTRACT

A locker includes a pair of upstanding walls, at least one shelf, and a rack coupled to the shelf. The shelf extends at least partially between the sidewalls. The rack includes a pair of upstanding, spaced-apart posts, a cross member extending between the posts, and a third post coupled to the cross member. The pair of posts and the cross member are a tubular shape. The third post is configured to contact and support the interior of a helmet.

11 Claims, 5 Drawing Sheets

Related U.S. Application Data continuation of application No. 15/804,286, filed on Nov. 6, 2017, now Pat. No. 10,935,316.

(51) Int. Cl.

| | |
|---|---|
| ***A47B 88/40*** | (2017.01) |
| ***A63B 71/00*** | (2006.01) |
| ***F26B 9/00*** | (2006.01) |
| ***F26B 9/06*** | (2006.01) |

(52) U.S. Cl.

CPC ................. *A47B 2220/0077* (2013.01); *A47B 2220/0091* (2013.01)

(56) References Cited

U.S. PATENT DOCUMENTS

| | | | | |
|---|---|---|---|---|
| 6,880,771 | B2 | 4/2005 | Collier | |
| 8,365,950 | B2 | 2/2013 | Yuyama et al. | |
| 10,935,316 | B2 * | 3/2021 | Allen | A47B 61/003 |
| 11,609,045 | B1 * | 3/2023 | Allen | A47B 61/02 |
| 2005/0204579 | A1 | 9/2005 | Rosseau et al. | |
| 2006/0112828 | A1 | 6/2006 | Ehlers | |
| 2008/0218047 | A1 * | 9/2008 | Buczynski | A61L 2/208 312/334.7 |
| 2011/0025181 | A1 * | 2/2011 | Vinke | A47B 67/04 439/577 |
| 2012/0193312 | A1 | 8/2012 | Sjolander et al. | |
| 2015/0136715 | A1 * | 5/2015 | Tremblay | A47B 61/04 211/36 |
| 2017/0290726 | A1 | 10/2017 | Hovenden et al. | |

OTHER PUBLICATIONS

Office Action dated Apr. 5, 2019 from U.S. Appl. No. 15/804,286.
Amendment dated Jun. 26, 2019 from U.S. Appl. No. 15/804,286.
Notice of Non-Compliant Amendment dated Oct. 17, 2019 from U.S. Appl. No. 15/804,286.
Response to Notice of Non-Compliant Amendment dated Oct. 31, 2019 from U.S. Appl. No. 15/804,286.
Office Action dated Dec. 11, 2019 from U.S. Appl. No. 15/804,286.
Amendment After Final dated Jan. 13, 2020 from U.S. Appl. No. 15/804,286.
Advisory Action dated Mar. 10, 2020 from U.S. Appl. No. 15/804,286.
Amendment under 37 C.F.R. Section 1.114 dated Mar. 23, 2020 from U.S. Appl. No. 15/804,286.
Office Action dated May 1, 2020 from U.S. Appl. No. 15/804,286.
Amendment dated Jun. 2, 2020 from U.S. Appl. No. 15/804,286.
Final Office Action dated Aug. 5, 2020 from U.S. Appl. No. 15/804,286.
Amendment After Final dated Sep. 30, 2020 from U.S. Appl. No. 15/804,286.
Advisory Action dated Oct. 15, 2020 from U.S. Appl. No. 15/804,286.
Amendment under 37 C.F.R. Section 1.114 dated Oct. 20, 2020 from U.S. Appl. No. 15/804,286.
Notice of Allowance dated Nov. 3, 2020 from U.S. Appl. No. 15/804,286.
Office Action dated Jul. 22, 2022 from U.S. Appl. No. 17/189,647.
Amendment dated Oct. 19, 2022 from U.S. Appl. No. 17/189,647.
Notice of Allowance dated Nov. 14, 2022 from U.S. Appl. No. 17/189,647.
Supplemental Notice of Allowance dated Nov. 23, 2022 from U.S. Appl. No. 17/189,647.

* cited by examiner

LOCKER WITH EQUIPMENT RACK

This application is a continuation of U.S. patent application Ser. No. 17/189,647, filed 2 Mar. 2021, titled "Locker with Equipment Rack," which is a continuation of U.S. patent application Ser. No. 15/804,286, filed 6 Nov. 2017, titled "Locker with Equipment Rack," which issued as U.S. Pat. No. 10,935,316 on 2 Mar. 2021, all of which are incorporated herein for all purposes.

CROSS REFERENCE TO RELATED APPLICATIONS

This application contains technical disclosure in common with U.S. patent application Ser. No. 17/870,501, filed 21 Jul. 2022, titled "Locker with Equipment Rack-Quick Dry Shoe Drawer."

BACKGROUND

1. Field of the Invention

The present invention relates generally to improvements in lockers or storage cabinets used in athletic or sporting facilities, and more specifically to compartments within such lockers configured and adapted especially for storing equipment such as pads or helmets.

2. Description of Related Art

The aesthetics and utility of lockers or storage cabinets in "locker rooms" of athletic and sporting facilities of sports teams and country clubs, for example, have become a measure of the quality and prestige of such organizations and an increasingly important aspect of recruiting new team or club members. Modern lockers are a far cry from the simple wood or metal cabinets of the past.

Modern lockers may incorporate storage for specific items of equipment, such as helmets and shoes, and features promoting comfort and luxury. One consistent problem in locker rooms of all types is the storage of heavy, cumbersome equipment such as football, lacrosse, or hockey helmets and pads. There is a constant need for improvement in this and other aspects of such lockers.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
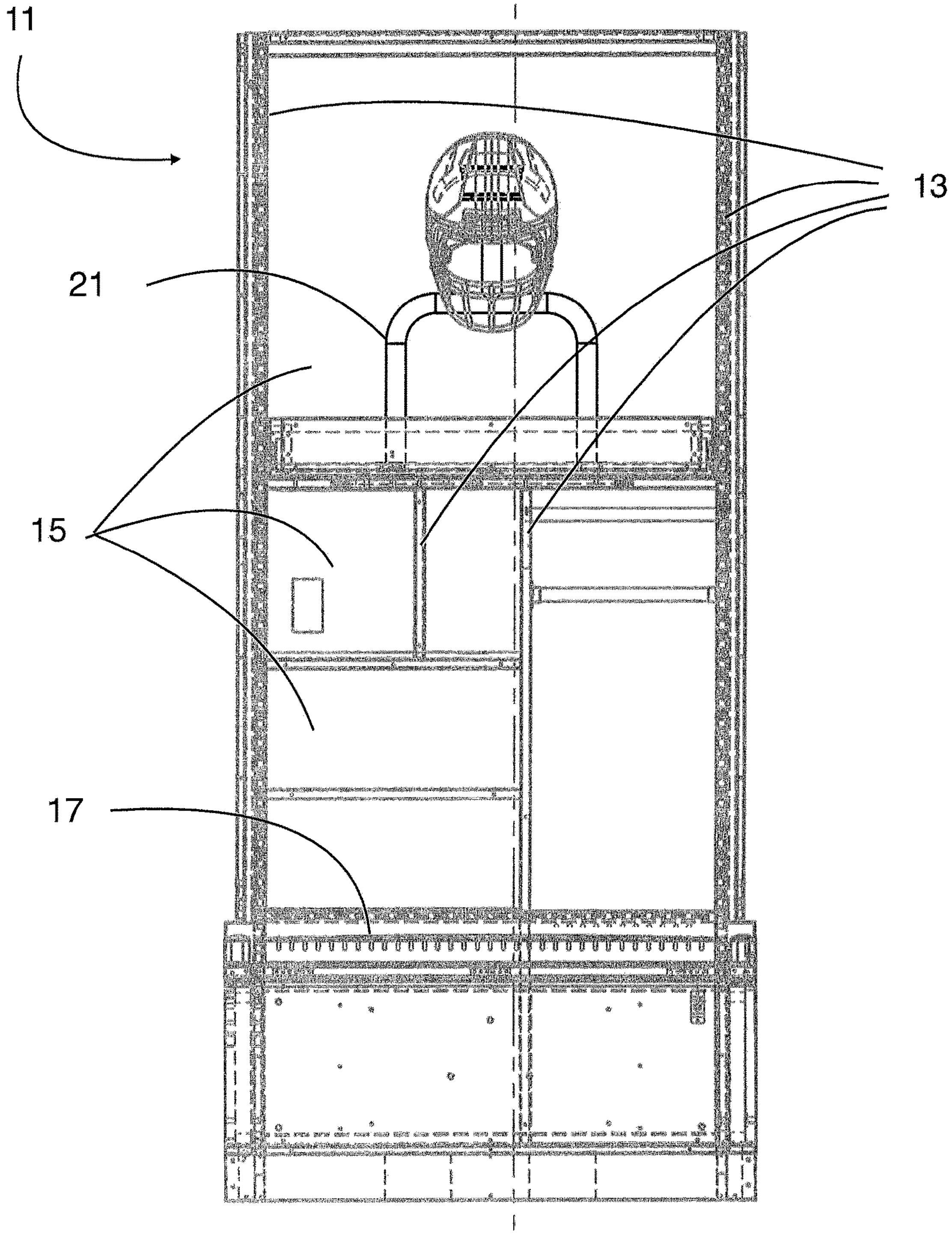
FIG. 1 is a front elevation view, partially in section, of a locker incorporating the equipment storage fixture or rack according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the locker according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
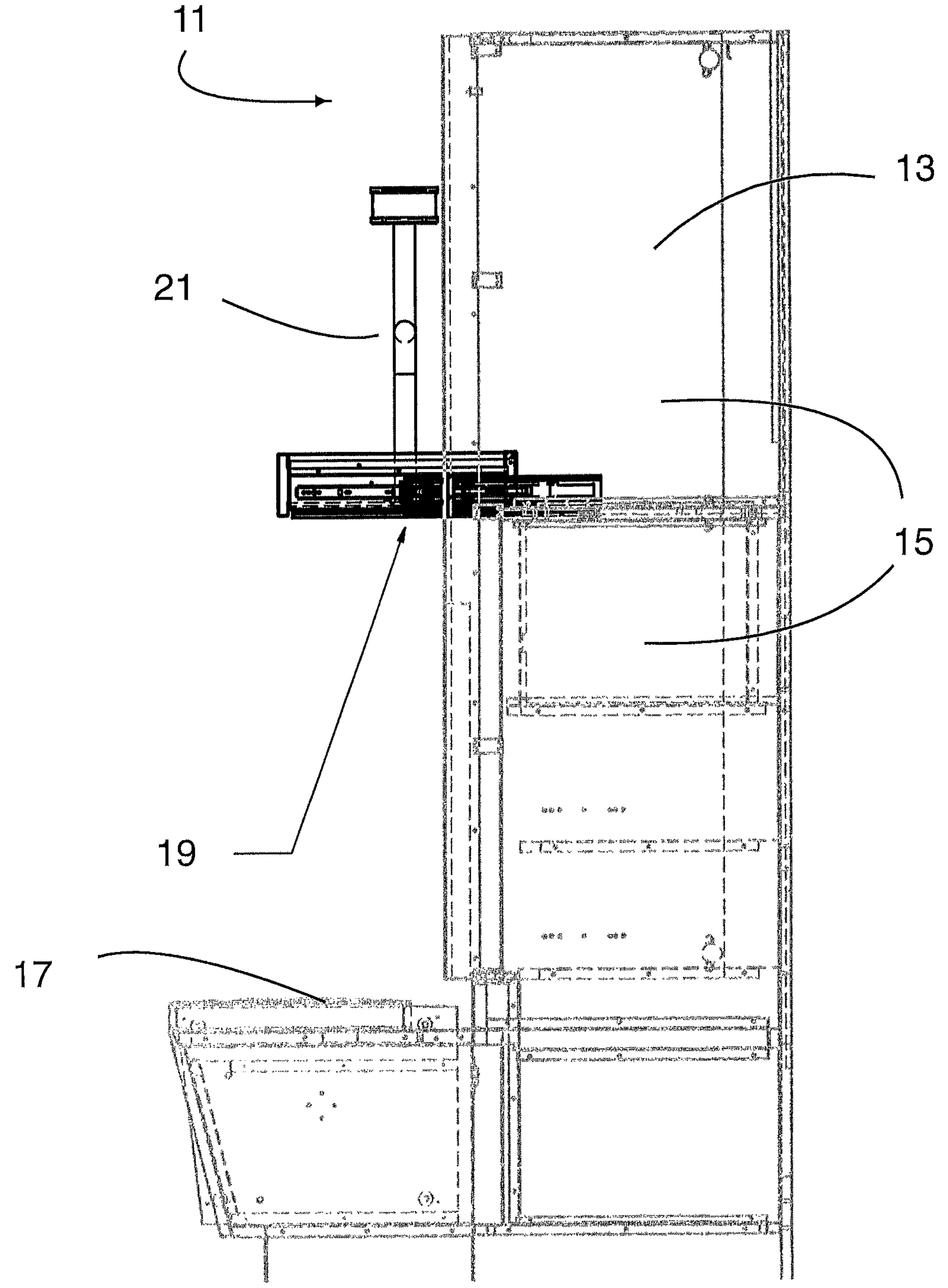
FIG. 2 is a side elevation view, partially in section of the locker of FIG. 1.

Referring now to FIGS. 1 and 2 in the drawings, a locker 11 according to an embodiment of the present application is depicted. Locker 11 comprises a pair of upstanding sidewalls 13 that generally define the extent of the locker. Each locker 11 may be installed adjacent to another, similar or identical locker, with its rear against a wall, and its front facing the interior of the locker room.

Between the sidewalls 13 of locker 11, a plurality of compartments 15 are defined by shelves or other horizontally extending surfaces or platforms. As used herein, "sidewall" or "sidewalls" may refer to either "main" sidewalls 13 or other upstanding or generally vertical sidewalls arranged between the "main" sidewalls. Multiple additional sidewalls 13 may be placed between the "main" or exterior sidewalls 13 to define compartments 15 in cooperation with generally horizontally extending shelves. Each compartment 15 may be sized and otherwise configured for storage of clothing or sporting equipment or other items and may include at least one door, which may be lockable. Locker 11 may also be provided with a bench seat 17 or similar seating arrangement.

Among the compartments in locker 11 according to the present application may be a helmet or pad compartment, generally located at the upper end of locker 11. An equipment fixture or rack 21 may be disposed on the shelf defining the lower extent of the helmet or pad compartment. Rack 21 may be configured and arranged to store a football or similar helmet alone or together with shoulder pads or other protective equipment. The shelf on which rack 21 is mounted may preferably be provided with drawer slides to permit the shelf and rack 21 to move horizontally in and out of the compartment of locker 11 between an extended or deployed position and a stored position for ease of use, as shown in FIG. 2 (see also FIG. 5, below). The shelf may also be provided with a tilting feature to permit downward tilting of the shelf when pulled forward or out of the compartment, again for ease of placing and removing equipment on rack 21. Rack 21 may be mounted directly to a shelf, with or without sliding or tilting features, or to a separate platform or other member carried by the shelf or sidewall 13.

Figure 3A:
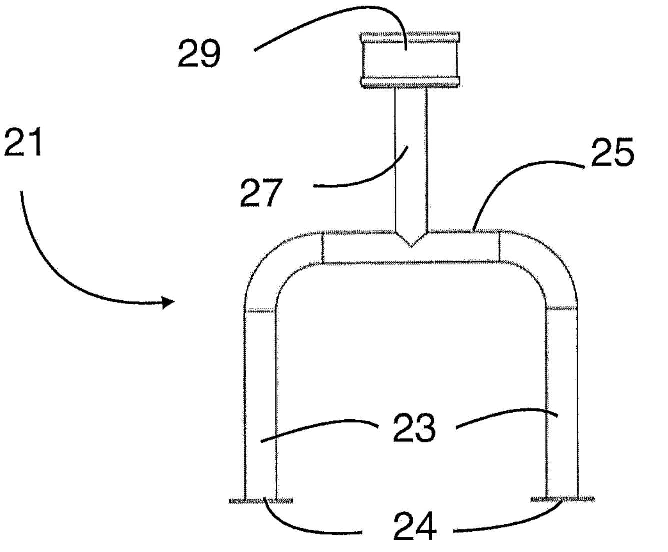
FIGS. 3A and 3B are elevation and perspective views of the equipment storage fixture or rack shown in FIGS. 1 and 2.
Figure 3B:
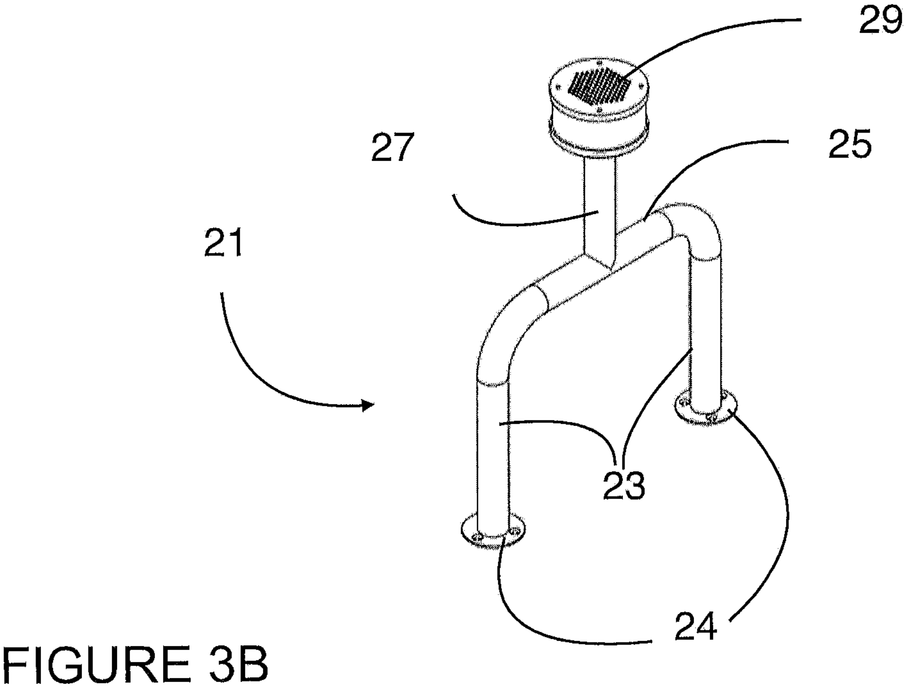

As shown in FIGS. 3A and 3B, rack 21 may comprise a pair of upstanding, spaced-apart posts 23, which are secured to the shelf or platform by flanges 24. Posts 23 may be connected at their upper ends by a cross-member or crossbar 25. The distance or dimension between posts 25 may be narrower than a pair of shoulder pads and the height of crossbar 25 may be sufficient to support the pads above the shelf so that the pads contact only rack 21. A helmet post 27 may extend upwardly from approximately the center or middle of crossbar 25 and may terminate in a helmet support member 29, which contacts and supports the interior of a helmet. Helmet post 27 may be dimensioned so that a helmet is suspended entirely above crossbar 25 (as shown in FIG. 1). Helmet support member 29 may incorporate a ventilator or helmet ventilation system. The ventilator may be an electric fan contained in a perforated housing that is operably associated with support member 29, preferably a model QFR0812SH-F00 from Delta Products Corp., 46101 Fremont Blvd, Fremont, CA 94538, U.S.A. The fan may circulate air in, around, and through a helmet or other equipment stored on post 27 for drying and deodorization purposes. Alternatively, the ventilator may be coupled to a "forced air" ventilation or air circulation system that is part of locker 11 or a system of lockers or a room HVAC system.

The fan may be powered by AC or DC electric current and may be provided with a switch to control its operation. The switch may be manually operated, or may be actuated automatically by the weight of the helmet on post 27 and support member 29, manually, by a timer, by voice actuation, by detection of the presence of a condition such as heat, moisture, or odor, or the like.

Rack or fixture 21 may be constructed of steel or aluminum tubing, welded or otherwise secured together in sections comprising posts 23, crossbar 25, and post 27 and secured to its shelf by screws or bolts through a flange, as illustrated. The hollow nature of the preferred tubing may permit passage of electric cables and air or other gases for power or ventilation and reduces the overall weight of rack 21.

Figure 4:
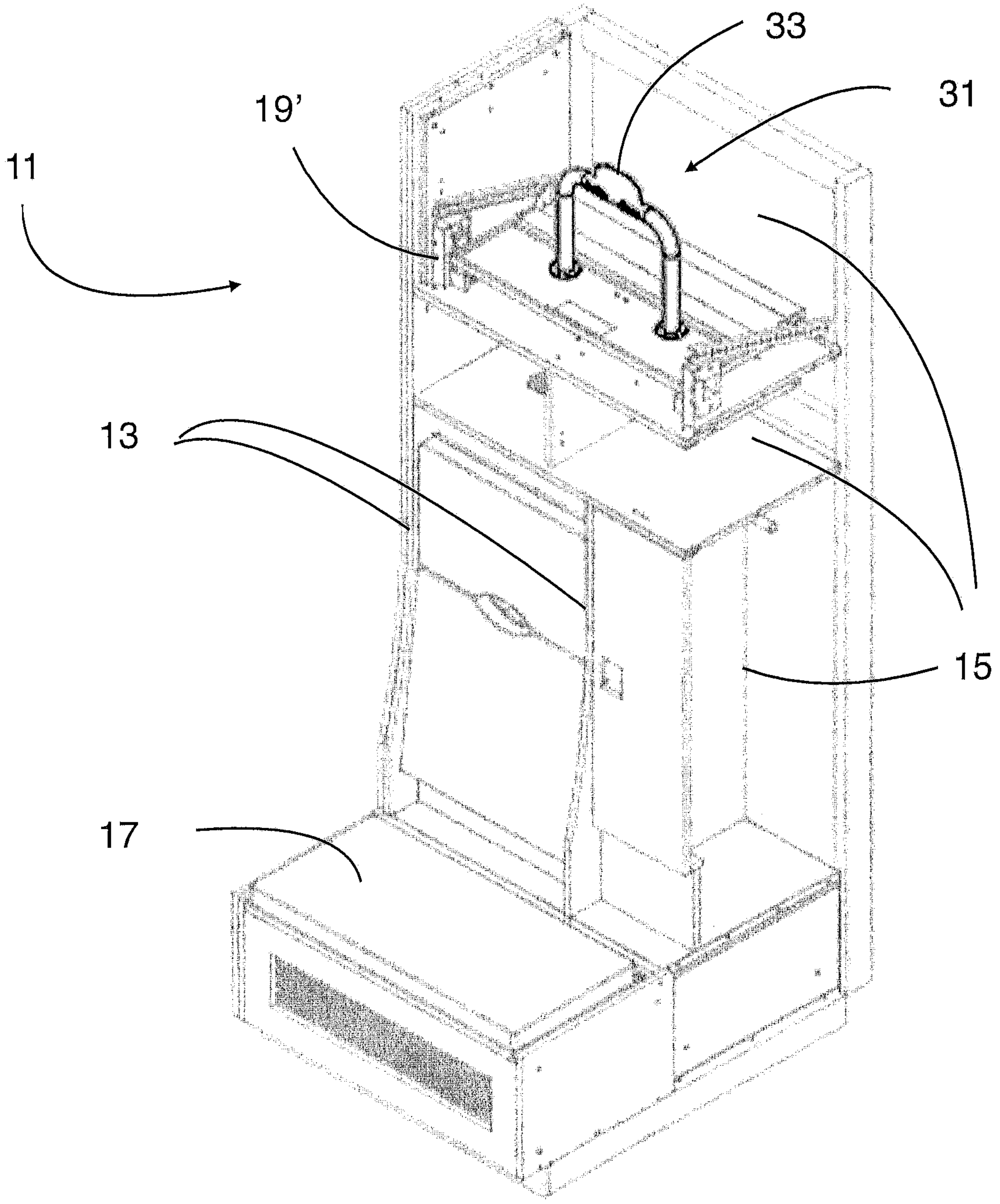
FIG. 4 is a perspective view of a locker incorporating the equipment storage fixture or rack according to a second embodiment of the present application.
Figure 5:
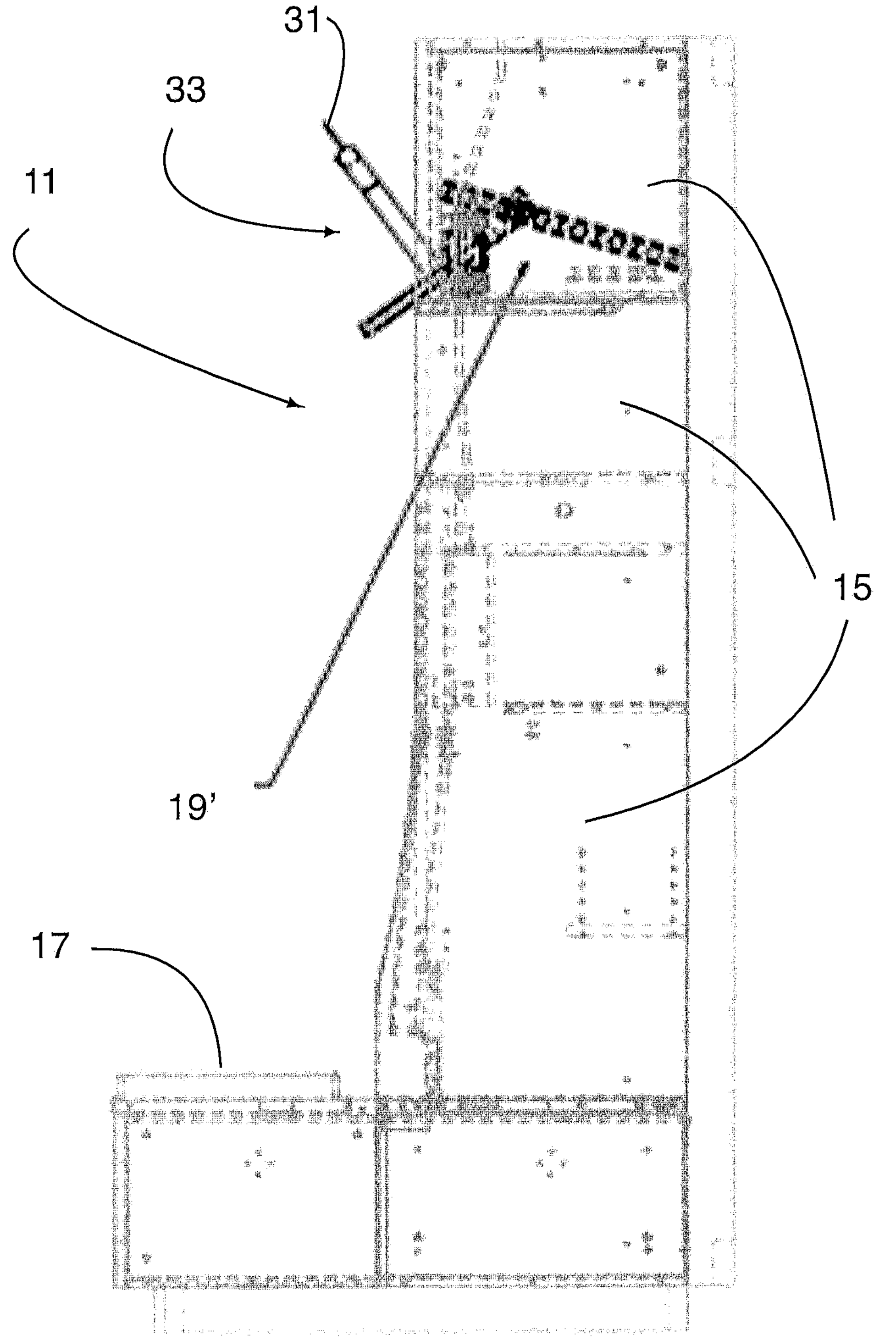
FIG. 5 is a side elevation view, partially in section, of the locker of FIG. 4.

FIGS. 4 and 5 depict a locker 11 similar to that of FIGS. 1 and 2, but incorporating a fixture or rack 31 according to another embodiment of the present application. Fixture or rack 31 is similar in form and operation to that illustrated in FIGS. 3A and 3B, except that helmet post 27 and support member 29 are omitted. This embodiment is intended for storage of pads, e.g. shoulder pads, only, and no helmet. Accordingly, a small vertical projection or tab takes the place of helmet post 27 and serves to help "center" or locate pads on rack 31. Further, as shown in FIG. 5, rack 31 may be mounted on a shelf with a tilting feature 19' that permits forward tilting of shelf and rack 31, with or without sliding the shelf forward or out of the storage compartment so that the shelf and rack 31 are movable between an extended or deployed position and a storage position. Again, rack 31 may be mounted directly to a shelf or to a platform coupled to or carried by the shelf or sidewall 13 of locker 11.

Rack or fixture 21 may include lights, speakers, or other functional and/or aesthetic features to improve the desirability of rack or fixture 21. For example, LED lights may be added to rack 21, so that when a helmet is placed on rack 21 the LED light illuminates to backlight the helmet. Such aesthetic features, such as lighting and sound systems, can be integral across a multi-locker system, so that the effects can be controlled from a central location and/or server. It will be appreciated that such automated systems can also be used in managerial and/or security functions to determine the presence or absence of a helmet and/or shoulder pads on rack 21. Thus, an equipment manager can quickly determine from a central server whether specific helmets and/or shoulder pads are missing.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

I claim:

1. A locker, comprising:
- a pair of upstanding sidewalls;
- at least one shelf extending at least partially between the sidewalls; and
- a rack coupled to the shelf, the rack comprising:
  - a pair of upstanding, spaced-apart, non-perforated posts, each post having a hollow, tubular shape;
  - a non-perforated cross member extending between the posts, the cross member having a hollow, tubular shape; and
  - a third post coupled to the cross member, the third post configured to contact and support the interior of a helmet;
- wherein a top portion of the third post has perforations to allow airflow through the rack into the helmet; and
- wherein the top portion of the third post is planar with a larger radius than the third post.

2. The locker of claim 1, wherein the rack further comprises:
- at least one electrical connection point configured for connecting to an electrical power system, such that electrical power is provided to the rack.

3. The locker of claim 1, wherein the rack further comprises:
- at least one self-contained fan for providing airflow around the rack.

4. The locker of claim 1, further comprising:
- an air circulation system having at least one fan configured for providing airflow in, around and through the locker.

5. The locker of claim 4, wherein the air circulation system is coupled to and operably associated with an HVAC system of a room in which the locker is located.

6. The locker of claim 4, further comprising:
- at least one sensor system for automatically detecting and determining when to turn the air circulation system on and off.

7. The locker of claim 1, wherein the rack is movable between a stored position and a deployed position.

8. The locker of claim 1, further comprising:
- an electronic system having at least one power source, the electronic system being configured for providing one or more of the following features to the rack:
- lights;
- sound; and
- security.

9. The locker of claim 1, wherein the rack is made of steel.

10. The locker of claim 1, wherein the rack is made of aluminum.

11. The locker of claim 1, wherein the locker is sizably configured, such that a pair of shoulder pads and a helmet may be supported at the same time.

* * * * *